US009251849B2

(12) United States Patent
Wu et al.

(10) Patent No.: US 9,251,849 B2
(45) Date of Patent: Feb. 2, 2016

(54) MULTIMEDIA PROCESSING APPARATUS, METHOD, AND NON-TRANSITORY TANGIBLE COMPUTER READABLE MEDIUM THEREOF

(71) Applicant: HTC Corporation, Taoyuan, Taoyuan County (TW)

(72) Inventors: Jing-Lung Wu, Taoyuan (TW); Hsin-Ti Chueh, Taoyuan (TW); Jenn-Wein Wu, Taoyuan (TW); Lo-Chien Lee, Taoyuan (TW); Wen-Yuan Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 159 days.

(21) Appl. No.: 14/183,589

(22) Filed: Feb. 19, 2014

(65) Prior Publication Data

US 2015/0235669 A1  Aug. 20, 2015

(51) Int. Cl.
*G06F 17/00* (2006.01)
*G11B 27/022* (2006.01)
*G11B 27/22* (2006.01)
*H04N 9/802* (2006.01)

(52) U.S. Cl.
CPC .............. *G11B 27/022* (2013.01); *G11B 27/22* (2013.01); *H04N 9/802* (2013.01)

(58) Field of Classification Search
CPC .............. G10H 1/40; G10H 2210/076; G10H 2210/391; G10H 2250/285
See application file for complete search history.

(56) References Cited

U.S. PATENT DOCUMENTS

| 6,316,712 | B1 * | 11/2001 | Laroche | G10H 1/40 84/636 |
| 2002/0178012 | A1 * | 11/2002 | Wang | G10H 1/0058 704/503 |
| 2006/0048634 | A1 * | 3/2006 | Lu | G10H 1/40 84/612 |
| 2010/0300271 | A1 * | 12/2010 | Attias | G10H 1/40 84/612 |

* cited by examiner

*Primary Examiner* — Andrew C Flanders
(74) *Attorney, Agent, or Firm* — McClure, Qualey & Rodack, LLP (57) ABSTRACT

A multimedia processing apparatus, method, and non-transitory tangible computer readable medium thereof are provided. The multimedia processing apparatus of the present invention includes an interface and a processing unit. The interface receives an audio stream continuously, wherein the audio stream is defined with a time line. The processing unit performs the following operations every a predetermined time interval: (a) deciding a first portion of the audio stream with reference to a time instant of the time line, (b) calculating an energy of the first portion of the audio stream, and (c) calculating a difference between the energy and a previous energy. The processing unit decides a plurality of second portions of the audio stream and decides a beat point for each of the second portions by selecting the time instant that corresponds to the maximum difference within the second portion.

17 Claims, 8 Drawing Sheets

MULTIMEDIA PROCESSING APPARATUS, METHOD, AND NON-TRANSITORY TANGIBLE COMPUTER READABLE MEDIUM THEREOF

CROSS-REFERENCES TO RELATED APPLICATIONS

Not applicable.

BACKGROUND OF THE INVENTION

1. Field of the Invention

The present invention relates to multimedia processing apparatus, method, and non-transitory tangible computer readable medium thereof; more particularly, the present invention relates to multimedia processing apparatus, method, and non-transitory tangible computer readable medium thereof that decides beat points of an audio stream.

2. Descriptions of the Related Art

Due to the rapid development in the technology, multimedia of any kind has become ubiquitous in our daily life. People can derive pictures, videos, animations, audios, music files, and/or the like easily, such as taking them by recording device (e.g. cameras), downloading them from the Internet, etc.

There are some occasions that people have to utilize and/or manage these pictures, videos, animations, audios, music files, and/or the like. For example, a user may require a multimedia file including an audio, several videos, and several images for presentation. Conventionally, a user may utilize functions provided in a multimedia editing software to generate a multimedia file from scratch, which however is time-consuming.

Consequently, a technique that can easily generate a multimedia file by synthesizing different kind of media files is still in an urgent need.

SUMMARY OF THE INVENTION

To solve the aforementioned problems, the present invention provides a multimedia processing apparatus, a computer-implemented multimedia processing method, and non-transitory tangible computer readable medium thereof.

The multimedia processing apparatus of the present invention comprises an interface and a processing unit, wherein the processing unit is electrically connected to the interface. The interface is configured to receive an audio stream continuously, wherein the audio stream is defined with a time line. The processing unit is configured to perform the following operations every a predetermined time interval: (a) deciding a first portion of the audio stream with reference to a time instant of the time line, (b) calculating an energy of the first portion of the audio stream, and (c) calculating a difference between the energy and a previous energy. The time instants for deciding the first portions of the audio stream are different. The processing unit is further configured to decide a plurality of second portions of the audio stream and decide a beat point for each of the second portions by selecting the time instant that corresponds to the maximum difference within the second portion.

The computer-implemented multimedia processing method of the present invention comprises the following steps of: receiving an audio stream continuously, wherein the audio stream is defined with a time line and executing the following steps every a predetermined time interval: (a) deciding a first portion of the audio stream with reference to a time instant of the time line, (b) calculating an energy of the first portion of the audio stream, and (c) calculating a difference between the energy and a previous energy. The computer-implemented multimedia processing method of the present invention further comprises the step of deciding a plurality of second portions of the audio stream and the step of deciding a beat point for each of the second portions by selecting the time instant that corresponds to the maximum difference within the second portion. The time instants for deciding the first portions of the audio stream are different.

The non-transitory tangible computer readable medium is stored with a computer program. The computer program executes a multimedia processing method after being loaded into an electronic apparatus. The multimedia processing method comprises the following steps of: receiving an audio stream continuously, wherein the audio stream is defined with a time line and executing the following steps every a predetermined time interval: (a) deciding a first portion of the audio stream with reference to a time instant of the time line, (b) calculating an energy of the first portion of the audio stream, and (c) calculating a difference between the energy and a previous energy. The multimedia processing method further comprises the step of deciding a plurality of second portions of the audio stream and the step of deciding a beat point for each of the second portion by selecting the time instant that corresponds to the maximum difference within the second portion. The time instants for deciding the first portions of the audio stream are different.

According to the above descriptions, the present invention performs the following operations every a predetermined time interval: (a) deciding a first portion of the audio stream with reference to a time instant of the time line, (b) calculating an energy of the first portion of the audio stream, and (c) calculating a difference between the energy and a previous energy. Meantime, the present invention decides a plurality of second portions of the audio stream and decides a beat point for each of the second portions. Based on the aforementioned approaches, the present invention can decide beat point(s) of an audio stream on the fly. Since the present invention decides beat point(s) of an audio stream on the fly, it can work with any application that requires real-time processing.

For example, once the beat point(s) has been decided, a plurality of audio segments of the audio stream can be identified according to the beat points. The present invention can further generate a multimedia stream by synthesizing each of the audio segments with one of the media files. Since the beat point(s) are derived on the fly, the multimedia stream can be generated on the fly as well.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1A:
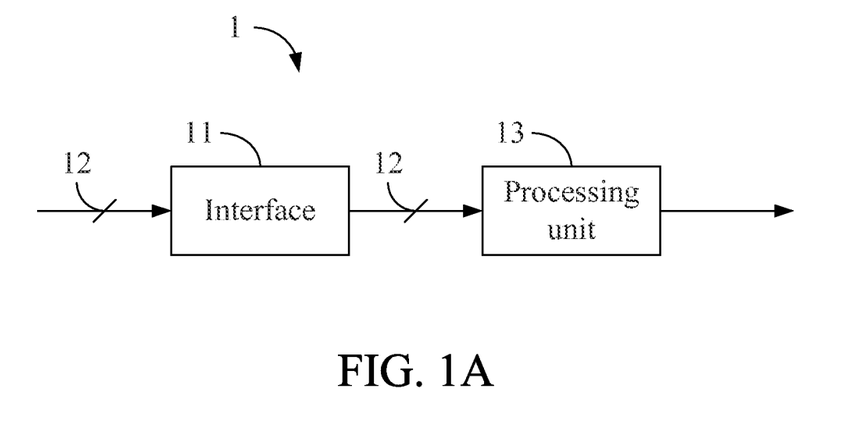
FIG. 1A illustrates a schematic view of the multimedia processing apparatus 1 of the first embodiments.

A first embodiment of the present invention is a multimedia processing apparatus 1 and a schematic view of which is depicted in FIG. 1A. The multimedia processing apparatus 1 may be an electronic apparatus, such as a personal computer, a notebook, a tablet computer, a mobile apparatus, or any other kinds of apparatuses having computing ability. The multimedia processing apparatus 1 comprises an interface 11 and a processing unit 13, wherein the processing unit 13 is electrically connected to the interface 11. The interface 11 may be any interface that can receive and transmit data, while the processing unit 13 may be any of various processors, central processing units (CPUs), microprocessors, or other computing devices that are well-known by those of ordinary skill in the art.

Figure 1B:
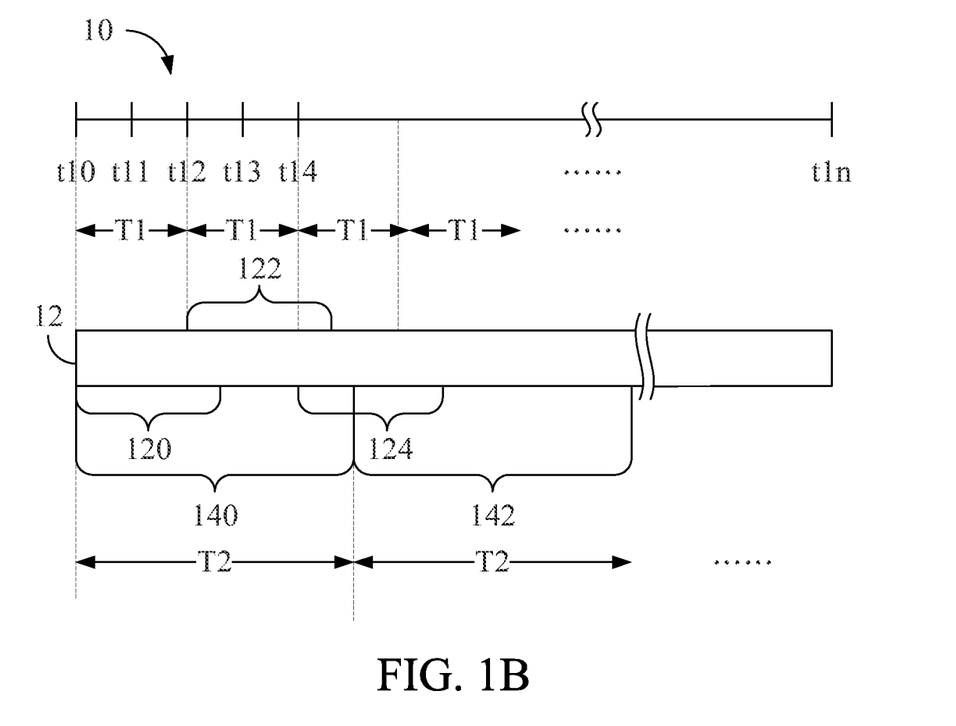
FIG. 1B illustrates the concept of deciding the beat points in the first embodiment.

The interface 11 receives an audio stream 12 from a remote source (not shown) continuously. It should be noted that the interface 11 may receive the audio stream 12 from a local storage unit (not shown) of the multimedia processing apparatus 1 as well. The audio stream 12 is defined with a time line 10 as shown in FIG. 1B. The time line 10 may be defined with a plurality of time instants t10, t11, t12, t13, t14, . . . , t1$n$. The beginning of the audio stream 12 is considered as happening at the time instant t10.

The processing unit 13 performs the following operations every a predetermined time interval T1 (e.g. every 1 millisecond): (a) deciding a portion of the audio stream 12 with reference to a time instant of the time line 10, (b) calculating an energy of the portion of the audio stream 12, and (c) calculating a difference between the energy and a previous energy. The above operations (a), (b), and (c) are detailed below.

At the time instant t10, the processing unit 13 decides a portion 120 of the audio stream 12 with reference to the time instant t10 of the time line 10. Next, the processing unit 13 calculates an energy (not shown) of the portion 120 of the audio stream 12. For example, the processing unit 13 may derive a frequency spectrum by applying Fast Fourier Transform (FFT) on the portion 120 of the audio stream 12 and then calculate the energy according to the frequency spectrum. It is noted that calculating the energy based on the frequency spectrum is just an example for illustration and is not used to limit the scope of the present invention. Next, if there is a previous energy (i.e. an energy calculated for a portion of the audio stream 12 that is previous to the portion 120), then the processing unit 13 calculates a difference between the energy and the previous energy. Since the portion 120 is the first portion of the audio stream 12, the processing unit 13 will not calculate the difference at this point.

After the lapse of the predetermined time interval T1, the processing unit 13 decides a portion 122 of the audio stream 12 with reference to the time instant t12 of the time line 10. Next, the processing unit 13 calculates an energy (not shown) of the portion 122 of the audio stream 12. Then, the processing unit 13 calculates a difference between the energy of the portion 122 and its previous energy (i.e. the energy of the portion 120). Similarly, after the lapse of another predetermined time interval T1, the processing unit 13 decides a portion 124 of the audio stream 12 with reference to the time instant t14 of the time line 10, calculates an energy (not shown) of the portion 124 of the audio stream 12, and calculates a difference between the energy of the portion 124 and its previous energy (i.e. the energy of the portion 122). The processing unit 13 will continuously perform the aforementioned operations (a), (b), and (c) every the predetermined time interval T1 during the time of receiving the audio stream 12.

Several points should be emphasized herein. The time instants t10, t12, t14, . . . for deciding the portions 120, 122, 124, . . . of the audio stream 12 are different; hence, the portions 120, 122, 124, . . . being used for calculating energies are different each time. In addition, the present invention does not limit the way to decide the portions 120, 122, 124, . . . of the audio stream 12. For example, one convenient approach is to decide the portions 120, 122, 124, . . . of the audio stream 12 by aligning a moving window with the corresponding time instant t10, t12, t14, . . . of the time line 10. The present invention does not limit the length of the portions 120, 122, 124, . . . of the audio stream 12 as well. Moreover, any two consecutive portions of the audio stream 12 (e.g. the portions 120, 122) are overlapped in this embodiment; however, they may be not overlapped in other embodiments.

Meantime, the processing unit 13 decides a plurality of portions of the audio stream 12 and decides a beat point for each of the portions by selecting the time instant that corresponds to the maximum difference of the second portion. Two examples are given below.

In the first example, the processing unit 13 decides a portion every a predetermined time interval T2, which means that the portions 140, 142, . . . are decided on the fly. The processing unit 13 decides a beat point for each of the portions 140, 142, . . . by selecting the time instant that corresponds to the maximum difference within the corresponding portion. For convenience, it is assumed that two differences have been calculated (i.e. the difference calculated at the time instant t12 and the difference calculated at the time instant t14) within the portion 140. The processing unit 13 selects the time instant t14 as one beat point because the difference calculated at the time instant t14 is the maximum difference within the portion 140. The processing unit 13 will continuously decide one beat point for another portion 142 by the same way during the time of receiving the audio stream 12, and so on. As the portions 140, 142, . . . are decided on the fly, the beat points are decided on the fly as well.

Figure 1C:
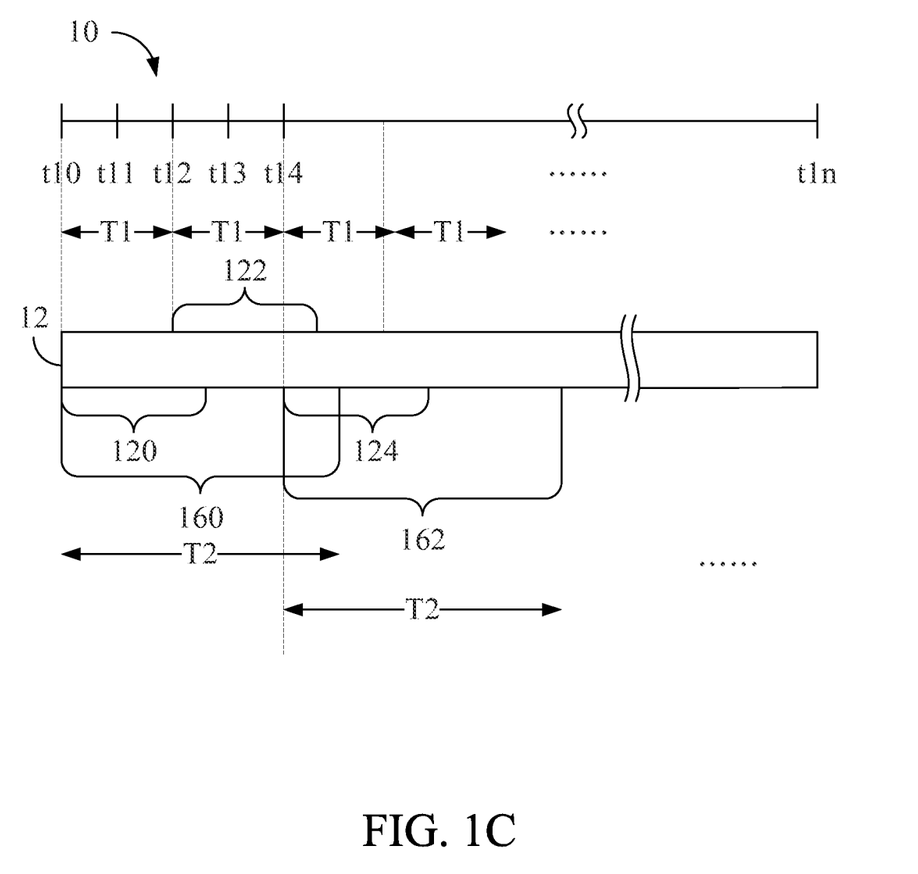
FIG. 1C illustrates another concept of deciding the beat points in the first embodiment.

Please refer to FIG. 1C for a second example of deciding the beat points. The processing unit 13 decides a portion 160 according to the predetermined time interval T2 and decides a beat point for the portion 160 by selecting the time instant that corresponds to the maximum difference within the portion 160. It is assumed that the time instant t14 is decided as the beat point in the second portion 160. Then, the processing unit 13 decides another portion 162 according to the beat point of the previous portion (i.e. the portion 160) and the predetermined time interval T2. To be more specific, the portion 162 starts from the time instant t14 and lapse for the predetermined time interval T2. Then, the processing unit 13 decides a beat point for the portion 162 by selecting the time instant that corresponds to the maximum difference within the portion 162. The processing unit 13 will continue the aforementioned procedure for deciding beat points. Similarly, as the portions 160, 162, ... are decided on the fly, the beat points are decided on the fly as well.

It is emphasized that the multimedia processing apparatus 1 performs the aforementioned operations (a), (b), and (c) every the predetermined time interval T1 and decides a beat point every once a while (i.e. when there are enough differences been calculated). In other words, the multimedia processing apparatus 1 decides the beat points on the fly. Hence, when only a part of the audio stream 12 is received, the multimedia processing apparatus 1 is still able to decide beat point(s) based on the received part of the audio stream 12. Since the multimedia processing apparatus 1 decides beat point(s) of an audio stream on the fly, it can work with any application that requires real-time processing.

Figure 2A:
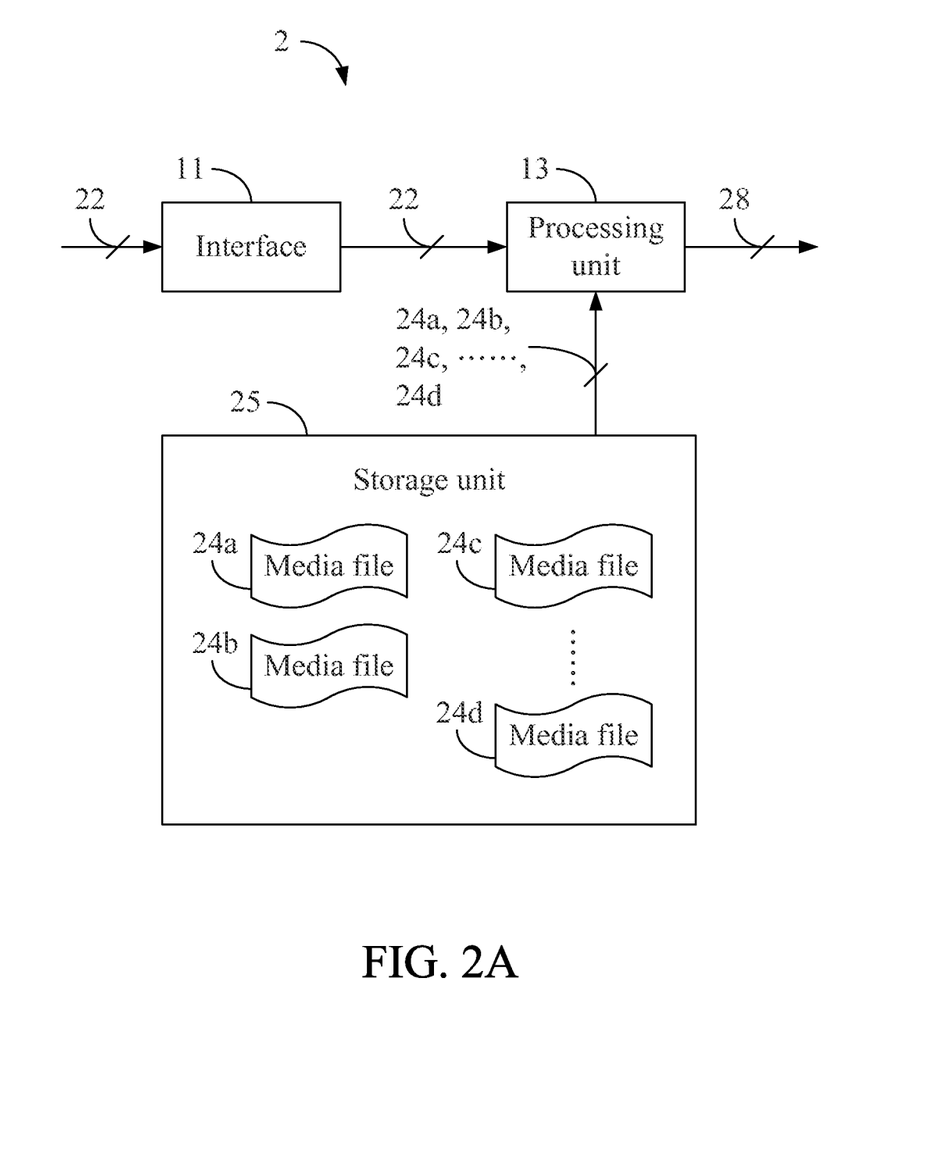
FIG. 2A illustrates a schematic view of the multimedia processing apparatus 2 of the second embodiments.

A second embodiment of the present invention is a multimedia processing apparatus 2 and a schematic view of which is depicted in FIG. 2A. The multimedia processing apparatus 2 may be an electronic apparatus, such as a personal computer, a notebook, a tablet computer, a mobile apparatus, or any other kinds of apparatuses having computing ability. The multimedia processing apparatus 2 comprises an interface 11, a processing unit 13, and a storage unit 25 being electrically connected to the processing unit 13.

The interface 11 and the processing unit 13 comprised in the multimedia processing apparatus 2 are able to perform all the operations and have all the functions as those described in the first embodiment, so the details will not be repeated herein again. The storage unit 25 may be a memory, a floppy disk, a hard disk, a compact disk (CD), a mobile disk, a database, or any other storage media or circuit with the same function and well known to those skilled in the art. The storage unit 25 is stored with a plurality of media files 24a, 24b, 24c, ..., 24d, wherein each of the media files 24a, 24b, 24c, ..., 24d may be an image, a video, an animation, a text, or the like.

Figure 2B:
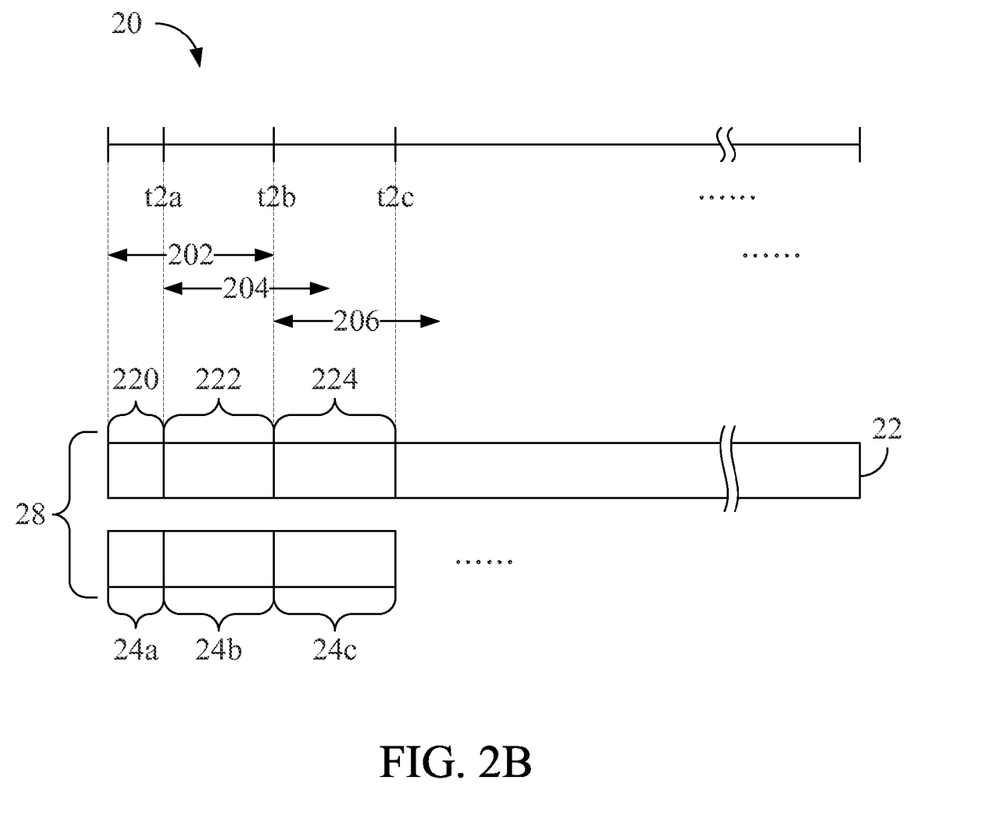
FIG. 2B illustrates the concept of generating the multimedia stream 28 in the second embodiment.

In this embodiment, the interface 11 receives an audio stream 22 continuously, wherein the audio stream is defined with a time line 20 as shown in FIG. 2B. Similar to the first embodiment, the processing unit 13 performs the following operations every the predetermined time interval T1: (a) deciding a portion of the audio stream 22 with reference to a time instant of the time line 20, (b) calculating an energy of the portion of the audio stream 22, and (c) calculating a difference between the energy and a previous energy, wherein the time instants for deciding the portions of the audio stream 22 are different. Meantime, the processing unit 13 decides a beat point every the predetermined time interval T2 for the audio stream 22 by selecting the time instant that corresponds to the maximum difference within the second predetermined time interval. Since the details for performing the above operations (a), (b), and (c) and the details for deciding the beat points are similar to those in the first embodiment, so they are not repeated again herein.

Please refer to FIG. 2B as well. It is assumed that the processing unit 13 has decided that the time instant t2a is the beat point within the portion 202, the time instant t2b is the beat point within the portion 204, and the time instant t2c is the beat point within the portion 206, etc.

A plurality of audio segments 220, 222, 224, ... of the audio stream 22 can be identified by the beat points (i.e. the time instants t2a, t2b, t2c, ...) by the processing unit 13. In other words, it may be considered as the audio stream 22 being virtually divided into the audio segments 220, 222, 224, ... by the beat points (i.e. the time instants t2a, t2b, t2c, ...) The word "virtually" is used to reflect the fact that the audio stream 22 is not actually divided into the audio segments 220, 222, 224, etc. The audio segments 220, 222, 224, ... are simply identified by the beat points (i.e. the time instants t2a, t2b, t2c, ...).

In this embodiment, the processing unit 13 further generates a multimedia stream 28 by synthesizing each of the audio segments 220, 222, 224, ... with one of the media files 24a, 24b, 24c, ..., 24d. It is noted that the media files synthesized with any two consecutive audio segments are different. For example, in this embodiment, the processing unit 13 synthesizes the audio segments 220 with the media file 24a, synthesizes the audio segments 222 with the media file 24b, synthesizes the audio segments 224 with the media file 24c, etc. It is noted that the media files 24a, 24b synthesized with the two consecutive audio segments 220, 222 are different and the media files 24b, 24c synthesized with the two consecutive audio segments 222, 224 are different, etc.

As mentioned, the multimedia processing apparatus 2 performs the aforementioned operations (a), (b), and (c) every the predetermined time interval T1 and decides a beat point every the predetermined time interval T2, which means that the beat points (i.e. the time instants t2a, t2b, t2c, ...) are decided on the fly. As a result, the audio segments 220, 222, 224, ... can be determined and synthesized with the media files 24a, 24b, 24c, ... on the fly as well.

Figure 3A:
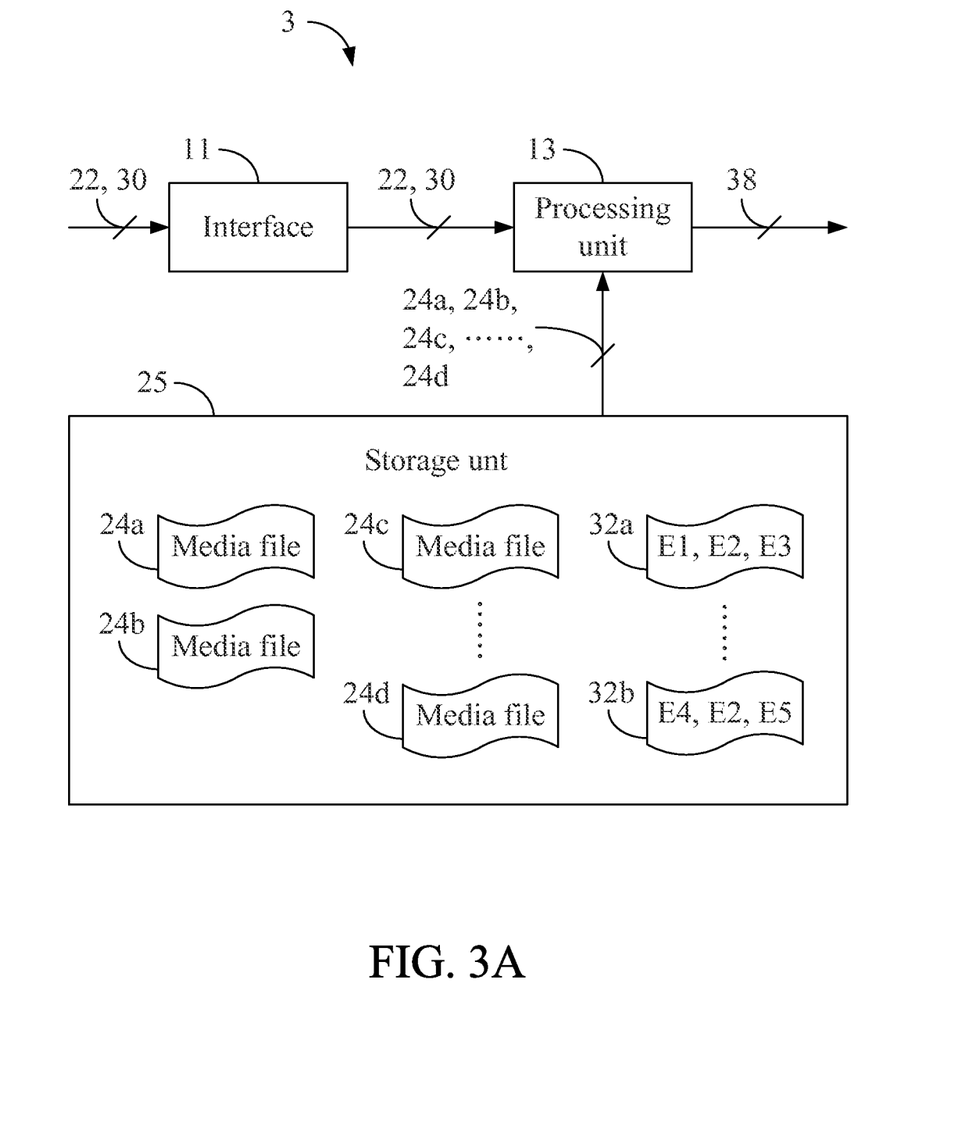
FIG. 3A illustrates a schematic view of the multimedia processing apparatus 3 of the third embodiments.

A third embodiment of the present invention is a multimedia processing apparatus 3 and a schematic view of which is depicted in FIG. 3. The multimedia processing apparatus 3 may be an electronic apparatus, such as a personal computer, a notebook, a tablet computer, a mobile apparatus, or any other kinds of apparatuses having computing ability. The multimedia processing apparatus 3 comprises an interface 11, a processing unit 13, and a storage unit 25.

The interface 11, the processing unit 13, and the storage unit 25 comprised in the multimedia processing apparatus 3 are able to perform all the operations and have all the functions as those described in the first and second embodiments, so the details will not be repeated herein again. In this embodiment, the storage unit 25 is additionally stored with a plurality of themes 32a, ..., 32b, wherein each of the themes 32a, ..., 32b comprises a plurality of effects. Each of the effects is an operation that can be applied to a media file to result in a different visual result. For example, each of the effects may be a blurring effect, a panning effect, a zooming effect, a tilting effect, a twisting effect, or the like. In this embodiment, the theme 32a comprises the effects E1, E2, E3, while the theme 32b comprises the effects E4, E2, E5.

Figure 3B:
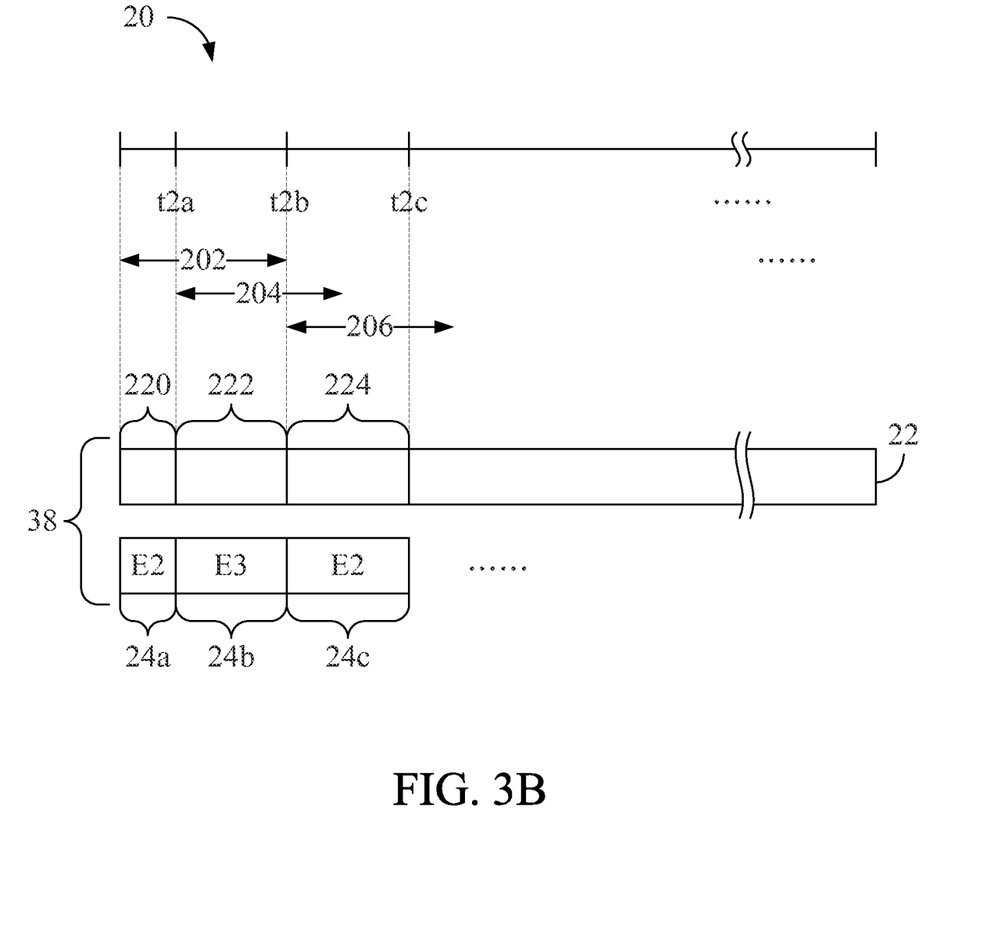
FIG. 3B illustrates the concept of generating the multimedia stream 38 in the third embodiment.

Comparing to the second embodiment, the multimedia processing apparatus 3 performs differently in the process of generating the multimedia stream 28. In this embodiment, a user may input an instruction 30 for selecting one of the themes 32a, ..., 32b, which will be used in the process of generating the multimedia stream 28. The interface 11 receives the instruction 30 and transmits the instruction 30 to the processing unit 13. It is assumed that the user selects the theme 32a via the instruction 30.

In this embodiment, the processing unit 13 generates a multimedia stream 38 by synthesizing each of the audio segments 220, 222, 224, ... with one of the media files 24a, 24b, 24c, ..., 24d according to a corresponding effect in the theme 32a. The processing unit 13 may randomly select one of the themes 32a, ..., 32b for each of the audio segments 220, 222, 224. For example, the processing unit 13 randomly selects the effect E2 and synthesizes the audio segments 220 with the media file 24*a* according to the effect E2, the processing unit 13 randomly selects the effect E3 and synthesizes the audio segments 222 with the media file 24*b* according to the effect E3, the processing unit 13 randomly selects the effect E2 and then synthesizes the audio segments 224 with the media file 24*c* according to the effect E2, etc. Similar to the second embodiment, the media files synthesized with any two consecutive audio segments are different. Since various effects are involved in the process of synthesizing the media files 24*a*, 24*b*, 24*c*, . . . and the audio segments 220, 222, 224, . . . , the resultant multimedia stream 38 has more varieties.

In other embodiments, the process of applying the effect to each of the audio segments 220, 222, 224, . . . with the corresponding media files 24*a*, 24*b*, 24*c*, . . . are elaborated. To be more specific, each of the audio segments 220, 222, 224, . . . is of a time length and each of the effects is of a time length. When processing each of the audio segments 220, 222, 224, . . . , the processing unit 13 determines a temporary set comprising the effects whose time length is shorter than the time length of the audio segments and selects the at least one effect from the temporary set randomly for the audio segment. It is assumed that the effects E1, E2, E3 are of 15 milliseconds, 5 milliseconds, and 2 milliseconds respectively and the audio segment 220 is of 10 milliseconds. The processing unit 13 determines a temporary set comprising the effects E2 and E3 because their time lengths are individually shorter than that of the audio segment 220. Then, the processing unit 13 selects the at least one effect from the temporary set randomly for the audio segment 220. By this approach, the effect that takes longer than the audio segment will not be selected. Hence, the processing unit 13 can apply effect to the media file corresponding to the audio segment more appropriately.

In this embodiment, the theme is selected by the user via inputting the instruction 30. It should be noted that one of the themes 32*a*, . . . , 32*b* may be set as a default theme in other embodiments. For those embodiments, if the user does not select a theme, the default theme will be used in the process of generating the multimedia stream.

Figure 4:
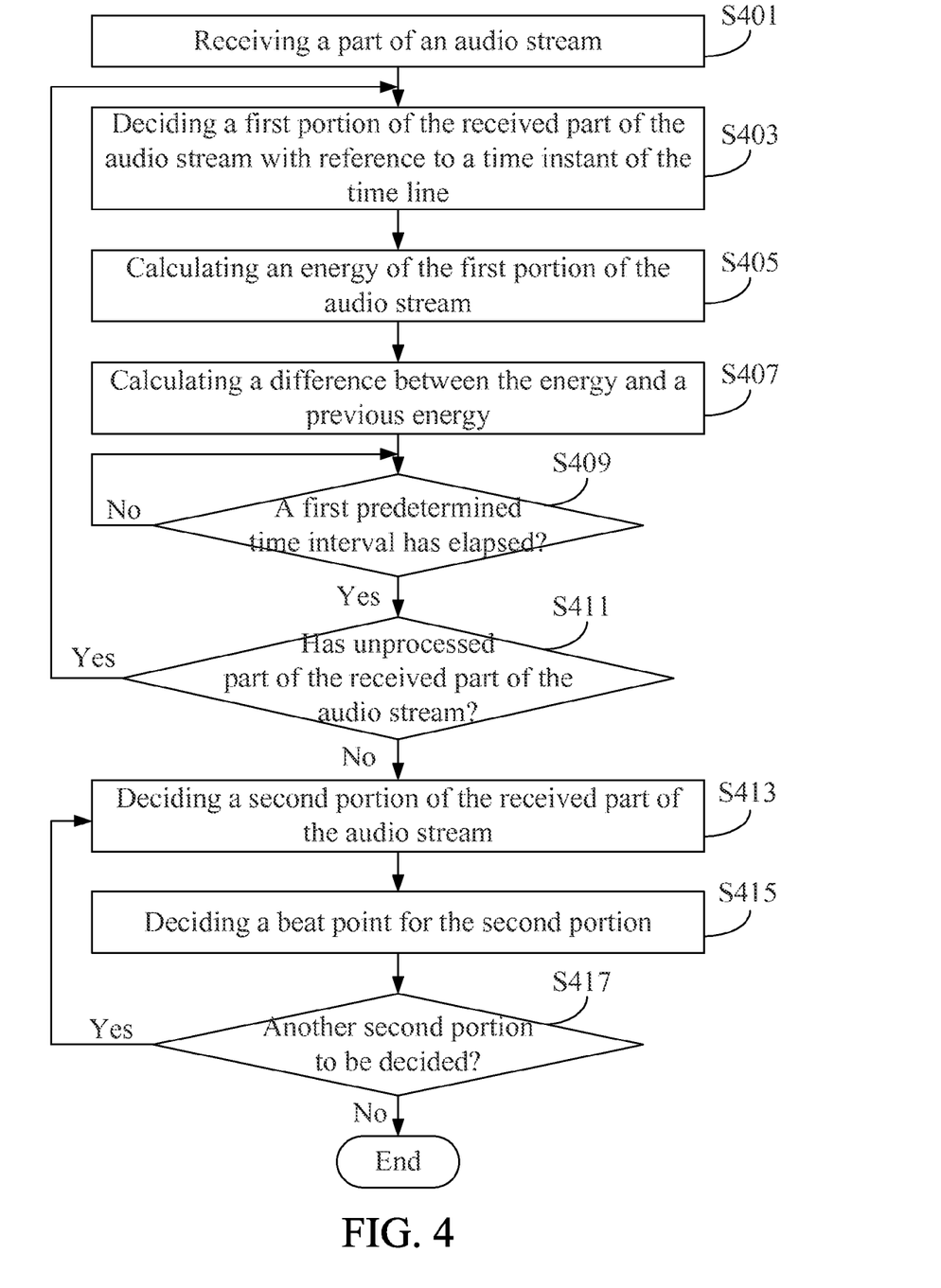
FIG. 4 illustrates a flowchart of the computer-implemented multimedia processing method of the fourth embodiment.

A fourth embodiment of the present invention is a computer-implemented multimedia processing method and a flowchart of which is illustrated in FIG. 4. The multimedia processing method is for use in an electronic device, e.g. the multimedia processing apparatus 1 in the first embodiment.

First, step S401 is executed by the electronic device for receiving a part of an audio stream, wherein the audio stream is defined with a time line. Next, step S403 is executed by the electronic device for deciding a portion of the received part of the audio stream with reference to a time instant of the time line. Following that, step S405 is executed by the electronic device for calculating an energy of the portion of the audio stream. Next, step S407 is executed by the electronic device for calculating a difference between the energy and a previous energy.

Following that, step S409 is executed by the electronic device for determining whether a first predetermined time interval has been elapsed. If the first predetermined time interval has not been elapsed, the multimedia processing method continues to wait. If the first predetermined time interval has been elapsed, step S411 is further executed by the electronic device for determining whether there is unprocessed part of the received part of the audio stream. If there is still unprocessed part of the received part of the audio stream, the multimedia processing method repeats the aforementioned steps S403 to S411 again.

If the step S411 determines that there is no unprocessed part of the received part of the audio stream, then step S413 is executed by the electronic device for deciding a second portion of the received part of the audio stream. The second portion may be decided according to a second predetermined time interval. Next, step S415 is executed by the electronic device for deciding a beat point for the second portion by selecting the time instant that corresponds to the maximum difference within the second portion.

Next, step S417 is executed by the electronic device for determining whether another second portion of the audio stream can be decided. If another second portion of the received part of the audio stream can be decided, the multimedia processing method repeats the aforementioned steps S413 to S417 again. If step S417 determines that no second portion can be further decided for the received part of the audio stream, the multimedia processing method ends the procedure of processing this received part of the audio stream.

It is emphasized that the multimedia processing method receives the audio stream continuously. That is, when there is still other part of the audio stream to be received, the multimedia processing method will continuously execute the aforementioned steps S401 to S417.

With the aforementioned steps, the beat points of the audio stream can be decided on the fly. In addition to the aforesaid steps, the fourth embodiment can execute all the operations and functions set forth in the first embodiment. How the fourth embodiment executes these operations and functions will be readily appreciated by those of ordinary skill in the art based on the explanation of the first embodiment, and thus will not be further described therein.

Figure 5:
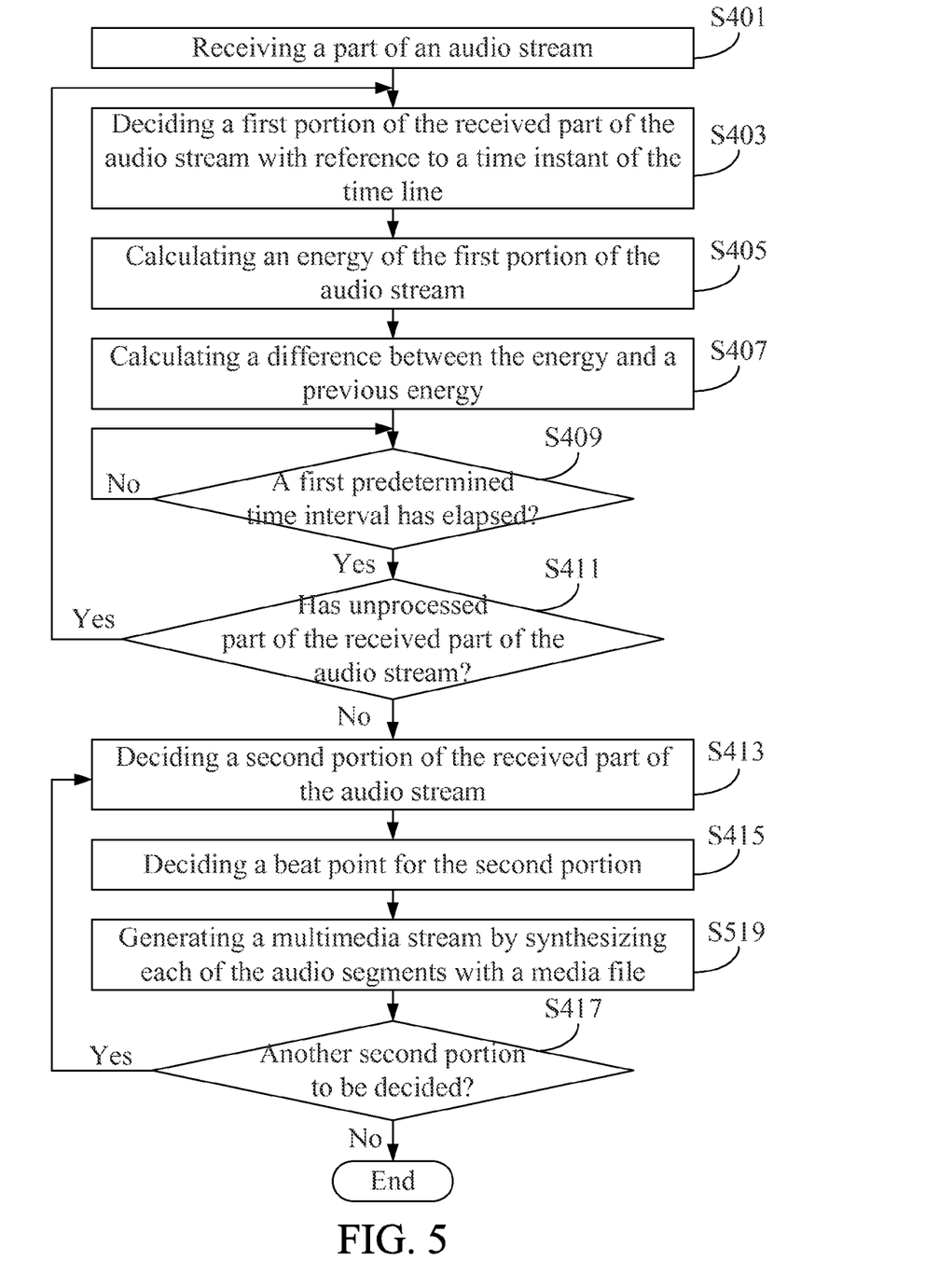
FIG. 5 illustrates a flowchart of the computer-implemented multimedia processing method of the fifth embodiment.

A fifth embodiment of the present invention is a computer-implemented multimedia processing method and a flowchart of which is illustrated in FIG. 5. The multimedia processing method is for use in an electronic device, e.g. the multimedia processing apparatuses 2, 3 in the second and third embodiment.

The multimedia processing method in this embodiment is similar to that in the fourth embodiment; that is, the multimedia processing method in this embodiment will execute steps S401 to S417 as well. As the details of these steps have been described in the fourth embodiment, they are not repeated again herein.

In this embodiment, there is another step S519 between the step S415 and the step S417. To be more specific, after the step S415, step S519 is executed by the electronic device for generating a multimedia stream by synthesizing each of the audio segments with a media file. It is noted that the media files synthesized with any two consecutive audio segments are different.

In some embodiments, the step S519 may generate the multimedia stream by synthesizing each of the audio segments with the corresponding media file according to at least one effect. If the electronic device is stored with a theme comprising a plurality of effects, the multimedia processing method may execute an additional step (not shown) for selecting the at least one effect from the theme randomly for each of the audio segments.

In some embodiments, the electronic device is stored with a theme comprising a plurality of effects, wherein each of the effects is of a time length. In addition, each of the audio segments is of a time length. For each of the audio segments, the multimedia processing method further executes a step (not shown) for determining a temporary set comprising the effects whose time length is shorter than the time length of the audio segments and executes another step (not shown) for selecting the at least one effect from the temporary randomly for the audio segment. Afterwards, step S519 is then executed.

In addition to the aforesaid steps, the fifth embodiment can execute all the operations and functions set forth in the second and third embodiments. How the fifth embodiment executes these operations and functions will be readily appreciated by those of ordinary skill in the art based on the explanation of the second and third embodiments, and thus will not be further described therein.

The multimedia processing methods of the fourth and fifth embodiments may be implemented by a computer program which is stored in a non-transitory tangible machine-readable medium. When the computer program is loaded into an electronic device, a plurality of codes comprised in the computer program will be executed by the electronic device to accomplish all the steps described in the fourth and fifth embodiments. This non-transitory tangible machine-readable medium may be a read only memory (ROM), a flash memory, a floppy disk, a hard disk, a compact disk (CD), a mobile disk, a database accessible to networks, or any other storage media with the same function and well known to those skilled in the art.

According to the above descriptions, the present invention performs the following operations every a first predetermined time interval: (a) deciding a portion of the audio stream with reference to a time instant of the time line, (b) calculating an energy of the portion of the audio stream, and (c) calculating a difference between the energy and a previous energy. Meantime, the present invention decides a beat point every a second predetermined time interval. Based on the aforementioned approaches, the present invention can decide beat point(s) of an audio stream on the fly. Hence, when only a part of an audio stream is received, the present invention is still able to decide beat point(s) based on the received part of the audio stream.

Once the beat point(s) has been decided, a plurality of audio segments of the audio stream can be identified according to the beat points. The present invention can further generate a multimedia stream by synthesizing each of the audio segments with one of the media files. Since the beat point(s) are derived on the fly, the multimedia stream can be generated on the fly as well. Nevertheless, in case that the multimedia stream does not have to be generated on the fly, the procedure for generating the multimedia stream can be postponed to the time that all the beat points have been decided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A multimedia processing apparatus, comprising:
   an interface, being configured to receive an audio stream continuously, wherein the audio stream is defined with a time line; and
   a processing unit, being electrically connected to the interface and configured to perform the following operations every a first predetermined time interval: (a) deciding a first portion of the audio stream with reference to a time instant of the time line, (b) calculating an energy of the first portion of the audio stream, and (c) calculating a difference between the energy and a previous energy;
   wherein the time instants for deciding the first portions of the audio stream are different and the processing unit is further configured to decide a plurality of second portions of the audio stream and decide a beat point for each of the second portions by selecting the time instant that corresponds to the maximum difference within the second portion.

2. The multimedia processing apparatus of claim 1, wherein each of the second portion is decided according to a second predetermined time interval.

3. The multimedia processing apparatus of claim 1, wherein a plurality of audio segments of the audio stream are identified according to the beat points and the multimedia processing apparatus further comprises:
   a storage unit, being stored with a plurality of media files, wherein the processing unit is further configured to generate a multimedia stream by synthesizing each of the audio segments with one of the media files, wherein the media files synthesized with any two consecutive audio segments are different.

4. The multimedia processing apparatus of claim 3, wherein the storage unit is further stored with a theme comprising a plurality of effects and the multimedia stream is generated by the processing unit by synthesizing each of the audio segments with the corresponding media file according to at least one of the effects.

5. The multimedia processing apparatus of claim 4, wherein the processing unit is further configured to select the at least one of the effects from the theme randomly for each of the audio segments.

6. The multimedia processing apparatus of claim 4, wherein each of the audio segments is of a time length, a theme comprises a plurality of effects, each of the effects is of a time length, and the processing unit is further configured to perform the following operations for each of the audio segments:
   determining a temporary set comprising the effects whose time length is shorter than the time length of the audio segments, and
   selecting the at least one effect from the temporary set randomly for the audio segment.

7. The multimedia processing apparatus of claim 1, wherein each of the portions of the audio stream is decided by aligning a moving window with the corresponding time instant.

8. The multimedia processing apparatus of claim 1, wherein the consecutive portions of the audio stream are overlapped.

9. A computer-implemented multimedia processing method, comprising the following steps of:
   receiving an audio stream continuously, wherein the audio stream is defined with a time line;
   executing the following steps every a first predetermined time interval:
     deciding a first portion of the audio stream with reference to a time instant of the time line;
     calculating an energy of the first portion of the audio stream; and
     calculating a difference between the energy and a previous energy;
   deciding a plurality of second portions of the audio stream; and
   deciding a beat point for each of the second portions by selecting the time instant that corresponds to the maximum difference within the second portion;
   wherein the time instants for deciding the first portions of the audio stream are different.

10. The computer-implemented multimedia processing method of claim 9, wherein each of the second portion is decided according to a second predetermined time interval.

11. The computer-implemented multimedia processing method of claim 9, wherein a plurality of audio segments of the audio stream are identified according to the beat points and the computer-implemented multimedia processing method further comprises the following step of:
- generating a multimedia stream by synthesizing each of the audio segments with a media file,
- wherein the media files synthesized with any two consecutive audio segments are different.

12. The computer-implemented multimedia processing method of claim 11, wherein the step of generating the multimedia stream synthesizes each of the audio segments with the corresponding media file according to at least one effect.

13. The computer-implemented multimedia processing method of claim 12, wherein a theme comprises a plurality of effects, the computer-implemented multimedia processing method further comprises the following step of:
- selecting the at least one effect from the theme randomly for each of the audio segments.

14. The computer-implemented multimedia processing method of claim 12, wherein each of the audio segments is of a time length, a theme comprises a plurality of effects, each of the effects is of a time length, and the computer-implemented multimedia processing method further comprises the following step of:
- performing the following steps for each of the audio segments:
  - determining a temporary set comprising the effects whose time length is shorter than the time length of the audio segments; and
  - selecting the at least one effect from the temporary set randomly for the audio segment.

15. The computer-implemented multimedia processing method of claim 9, wherein each of the portions of the audio stream is decided by aligning a moving window with the corresponding time instant.

16. The computer-implemented multimedia processing method of claim 9, wherein the consecutive portions of the audio stream are overlapped.

17. A non-transitory tangible computer readable medium, being stored with a computer program, the computer program executing a multimedia processing method after being loaded into an electronic apparatus, and the multimedia processing method comprising the following steps of:
- receiving an audio stream continuously, wherein the audio stream is defined with a time line;
- executing the following steps every a predetermined time interval:
  - deciding a first portion of the audio stream with reference to a time instant of the time line;
  - calculating an energy of the first portion of the audio stream; and
  - calculating a difference between the energy and a previous energy;
- deciding a plurality of second portions of the audio stream; and
- deciding a beat point for each of the second portions by selecting the time instant that corresponds to the maximum difference within the second portion;
- wherein the time instants for deciding the first portions of the audio stream are different.

* * * * *